(12) United States Patent
Garfin et al.

(10) Patent No.: US 11,371,906 B1
(45) Date of Patent: Jun. 28, 2022

(54) ONE-WAY VALVE TESTER AND METHOD OF USING SAME

(71) Applicants: Kris Garfin, Metairie, LA (US); David Novelli, New Orleans, LA (US)

(72) Inventors: Kris Garfin, Metairie, LA (US); David Novelli, New Orleans, LA (US)

(73) Assignee: PRECISION DIVING EQUIPMENT LLC, Metairie, LA (US)

( * ) Notice: Subject to any disclaimer, the term of this patent is extended or adjusted under 35 U.S.C. 154(b) by 0 days.

(21) Appl. No.: 17/065,308

(22) Filed: Oct. 7, 2020

Related U.S. Application Data

(60) Provisional application No. 62/911,705, filed on Oct. 7, 2019.

(51) Int. Cl.
G01M 3/28 (2006.01)

(52) U.S. Cl.
CPC ................................. *G01M 3/2876* (2013.01)

(58) Field of Classification Search
CPC .................................................... G01M 3/2876
See application file for complete search history.

(56) References Cited

U.S. PATENT DOCUMENTS

| | | | | |
|---|---|---|---|---|
| 1,455,077 A | * | 5/1923 | Coffman | G01M 3/2876 73/47 |
| 1,764,616 A | * | 6/1930 | Fleming | G01M 3/2876 73/47 |
| 2,446,219 A | * | 8/1948 | Eaton | G01M 3/26 73/40.5 R |
| 2,888,331 A | * | 5/1959 | Carpenter | G01M 3/025 436/3 |
| 2,981,095 A | * | 4/1961 | Eshbaugh | G01M 3/3227 73/40 |
| 3,132,505 A | * | 5/1964 | Kuhlman | G01M 3/2846 73/40 |
| 3,221,540 A | * | 12/1965 | Kilbourn | G01M 3/06 73/49.1 |
| 3,625,656 A | * | 12/1971 | Paulson | F01P 11/14 422/86 |
| 3,680,556 A | | 8/1972 | Morgan | |
| 3,841,348 A | | 10/1974 | O'Neill | |
| 3,958,275 A | | 5/1976 | Morgan et al. | |
| 3,968,794 A | | 7/1976 | O'Neill | |
| 3,995,627 A | | 12/1976 | O'Neill | |
| 4,211,220 A | | 7/1980 | O'Neill | |
| 4,534,208 A | * | 8/1985 | Macin | G01M 3/10 455/226.1 |
| 5,528,923 A | | 6/1996 | Ledez et al. | |
| 6,354,291 B1 | | 3/2002 | Brown et al. | |
| 6,626,178 B2 | | 9/2003 | Morgan et al. | |

(Continued)

*Primary Examiner* — Alexander A Mercado
(74) *Attorney, Agent, or Firm* — Garvey, Smith & Nehrbass, Patent Attorneys, L.L.C.; Vanessa M. D'Souza; Chales C. Garvey, Jr.

(57) ABSTRACT

A device for testing one-way or non-return valves, for example, those used during diving, that can be used to determine whether air is able to be sucked through the one-way or non-return valve and provides a visual confirmation of the test and outcome. The present invention also includes an improved method of testing one-way or non-return valves and a device for carrying out this method to make testing the one-way or non-return valve prior to diving safer and more effective.

19 Claims, 17 Drawing Sheets

(56) References Cited

U.S. PATENT DOCUMENTS

| | | | |
|---|---|---|---|
| 6,651,486 B1* | 11/2003 | Johnson | G01M 3/2815 |
| | | | 73/40 |
| 6,681,615 B1* | 1/2004 | Svanberg | G01M 3/2807 |
| | | | 73/40 |
| 6,834,649 B1 | 12/2004 | Kuo | |
| 7,798,142 B2 | 9/2010 | Morgan et al. | |
| 8,418,689 B1 | 4/2013 | Davenport | |
| 8,820,135 B2 | 9/2014 | Stone et al. | |
| 9,417,153 B2* | 8/2016 | Parker | G01M 3/20 |
| 9,869,603 B2* | 1/2018 | Parker | G01M 3/022 |
| 2009/0183735 A1 | 7/2009 | Tong et al. | |
| 2011/0057009 A1 | 3/2011 | McLeod et al. | |
| 2011/0296901 A1* | 12/2011 | Nichols | G01M 3/28 |
| | | | 73/49.8 |

* cited by examiner

ONE-WAY VALVE TESTER AND METHOD OF USING SAME

CROSS-REFERENCE TO RELATED APPLICATIONS

This application claims benefit of U.S. Provisional Patent Application Ser. No. 62/911,705, filed 7 Oct. 2019, which is hereby incorporated herein by reference.

Priority of U.S. Provisional Patent Application Ser. No. 62/911,705, filed 7 Oct. 2019, which is hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a device for testing one-way valves, also commonly referred to as a non-return valve, for example, those used during diving. More particularly, the present invention relates to a device and method to make testing a one-way or non-return valve prior to diving safer and more effective.

2. General Background of the Invention

The purpose of the one-way valve is to avoid injury or decompression illness associated with differential pressure (Delta P or ΔP or DP). The one-way or non-return valve stops air from escaping and creating a vacuum in the diver's helmet.

Mythbusters on The Discovery Channel did an experiment involving this hazard in an episode titled "Dumpster Diving" that can be viewed here: https://www.dailymotion-.com/video/x2n8zuu. The video examines the possible hazard of a diver's body getting sucked into his or her helmet due to differential pressure. The extreme hazard referenced may seem slightly exaggerated. However, the possibility of a suction being created is still present and could be deadly, but not quite as dramatic as that example.

Another reason for a one-way valve being put on the side block of a dive helmet is if the diver's breathing hose were to be severed or to disconnect, it would stop not only the Delta P, but it also would stop the air or breathing gas from the diver's emergency gas supply (EGS) from escaping through the hole where the dive hose was severed. The importance of a one-way valve is further supported by the Association of Diving Contractors International (ADCI). In its certification exam for supervisors, the ADCI names the one-way valve as the most important valve in the entire diving operation.

The one-way or non-return valve (NRV) functions as a check valve to ensure that air or breathing gas can enter the diver's helmet through an air-inlet, but does not flow in a reverse direction if the diver's hose were to be severed or disconnected, thereby preventing Delta P which can result in injury or death. This test is conducted before commencement of diving operations.

A user manual that comes with a dive helmet lists acceptable methods to test a one-way valve. Testing the valve is required before each dive. See, for example, the excerpts from a user manual for a commercially available Kirby Morgan® 37SS Diver's Helmet, attached hereto as Appendix A. Appendix A at page 30, section 3.6.4, "The one way valve must be tested daily, prior to commencement of diving operations." This manual, like most dive manuals lists two options for testing a one-way valve: A) "You can test the one-way valve by connecting the bailout bottle to the emergency valve and pressurizing the side block. There must be no gas leakage through the one-way valve." (See Appendix A at page 30, caption for the image on the page); or B) "You can also test the one-way valve by attempting to suck air through the valve. The emergency valve must be open for this test to work properly. If you are able to suck any air through the valve it is not working properly." (See Appendix A at page 31, caption for the image on the top left of the page). Other diving industry publications specify to blow into the one-way valve before applying suction, in doing so cycling the valve properly before beginning diving operations.

It is believed that a majority of dive companies, divers, and dive schools recommend and use testing method B, above, which is listed second in the manual. However, this method has some disadvantages in that it is up to the tester to determine whether air can be sucked through the valve, there is no gauge or other visible means of confirmation that the test was performed properly and that the device is in good working order. There is also a health risk for the divers using this method, as pathogens can be passed by multiple users placing his or her mouth on the valve for testing and because blowing into the one-way valve will push pathogens farther into the diver's breathing system. The present invention makes testing a one-way valve safer, more effective, and more reliable.

Such diving helmets with a one-way valve are known and commercially available (e.g., a Kirby Morgan 37SS diving helmet). Several patents have issued that relate to diving helmets having various valves or valving arrangements. Examples can be seen in the following table, each patent listed in the table is incorporated herein by reference.

TABLE

| PAT. NO. | TITLE | ISSUED |
| --- | --- | --- |
| 3,680,556 | Diving Helmet | Aug. 1, 1972 |
| 3,841,348 | Fluid Pressure Control Apparatus | Oct. 15, 1974 |
| 3,995,627 | Diving Helmet System | Dec. 7, 1976 |
| 3,958,275 | Helmet for Divers | May 25, 1976 |
| 3,968,794 | Underwater Breathing Apparatus | Jul. 13, 1976 |
| 4,211,220 | Diving Helmet Assembly | Jul. 8, 1980 |
| 6,626,178 | Full Mask with Face Seal and Removable Adaptors Allowing Full Access to Separate Spaces | Sep. 30, 2003 |
| 7,798,142 | Valve System for Underwater Diving Equipment | Sep. 21, 2010 |

BRIEF SUMMARY OF THE INVENTION

The present invention solves the problems in the prior art in a simple and straightforward manner.

The apparatus of the present invention is a device for testing one-way or non-return valves, for example, those used during diving. More particularly, the present invention relates to a device and method to make testing a one-way valve prior to diving safer, more effective, and more reliable.

The device of the present invention can be used to test other types of check/one-way/non-return valves, particularly in the commercial diving industry. For example, in addition to a diver's helmet, the device of the present invention can also be used to test the function of the one-way valves on a diver's volume tank (which is plumbed in between the compressor/gas bank and the diver), if a JIC #10 adaptor were attached on the JIC #6/O2b end. The device of the present invention preferably incorporates hyperbaric and medically approved materials for construction of the device. Preferably building the device of the present invention from approved materials makes it appropriate for testing other one-way valves in the diving industry.

Currently, a one-way valve is most often tested by a user attempting to use his or her mouth to blow air into and then suck air through the one-way valve. The emergency valve knob must be open for this test to work properly. If the user is able to suck any air through the one-way valve, the one-way valve is not working properly. The device of the present invention can be used to determine whether any air is able to be sucked through the one-way valve by providing a visual confirmation of the test and outcome.

A first preferred embodiment of the device of the present invention, which is considered to be a base model, preferably comprises: (a) a female oxygen fitting; (b) a first flow line, which preferably is a breathing gas hose; (c) a gas sampling vacuum bulb; (d) a second flow line, which preferably is a breathing gas hose; (e) a fitting, which preferably is a NPT (National Pipe Thread) fitting, which preferably is ¼-inch; and (f) a test valve, which preferably is a ball valve in this embodiment. Other valves can also be used including needle valves or any pressure relieving device.

A second preferred embodiment, which is considered an improved model, utilizes (g) a test valve, which preferably is a bleeder valve in place of the ball valve; and (h) a vacuum gauge.

These are common hardware parts and a prototype using these common parts has been created and tested. However, the diving industry is very meticulous with its breathing systems, and therefore, dive-specific components are preferred. Preferably, components of a device of the present invention are made of brass, stainless steel, chrome plated brass or other components that will not readily oxidize or corrode. Preferably non-metal materials will be food or medical grade materials that do not off-gas or release chemicals and/or are approved for use in diving systems.

Preferably, a female oxygen fitting of a preferred embodiment of the device of the present invention is brass, and preferably it has a ¼-inch barb, which generally can be the standard fitting for new dive helmets currently manufactured by most dive companies. Alternate sizes, barbs, and connections can be used to accommodate the current standards, and future standards, in the field, or specific valve sizes as needed. For example, some dive companies use an O2b or JIC #6 fitting in which case, an O2b or JIC #6 fitting can be installed. Various fittings can be used as needed as long as they can be fitted to a flow line or hose of the device. The female oxygen fitting preferably can_fit to the standard fitting on new dive helmets. The female oxygen fitting of preferred embodiment of the apparatus or device of the present invention attaches to the male oxygen fitting on a one-way valve, and the barbed end of the fitting is for affixing the fitting to a flow line or breathing gas hose of the device. Other means of attaching the fitting to the hose may be used besides a barbed connection, such as crimped, threaded, or other suitable methods.

Preferably, a first flow line is a breathing gas hose in one or more preferred embodiment of the apparatus or device of the present invention that is modified or modifiable to accommodate the other components. In a preferred embodiment, the hose is a divers' breathing gas hose. The divers' breathing gas hose is preferably made of materials safe for use in a breathing system, e.g., Gates 33HB or Gates divers air hose. The breathing gas hose can be modified as needed to accommodate the vacuum bulb. Different kinds of hose sizes and materials can be used and still function as needed for the device.

Preferably, a gas sampling vacuum bulb of a preferred embodiment of the device of the present invention is a commercially available gas sampling bulb of a same or similar to the style developed by Heathrow Scientific. Other types of vacuum bulbs can readily work in the device. The Heathrow Scientific brand bulb is preferable because the rubber used in it is least likely to release chemicals into the breathing system. Preferably, the gas sampling vacuum bulb is modified to test the non-return valve.

Preferably, second flow line is a breathing gas hose in one or more preferred embodiments of the apparatus or device of the present invention that is modified or modifiable to accommodate the other components. In a preferred embodiment, the hose is a divers' breathing gas hose. The divers' breathing gas hose is preferably made of materials safe for use in a breathing system, e.g., Gates 33HB or Gates divers air hose. The breathing gas hose can be modified as needed to accommodate the vacuum bulb. Different kinds of hose sizes and materials can be used and still function as needed for the device.

Preferably, a fitting of a preferred embodiment of the device or apparatus of the present invention is a ¼-inch NPT fitting with one end having a ¼-inch barb and the other end having a ¼-inch female NPT fitting. The barbed end is for attaching the fitting to the breathing gas hose or flow line. Alternate sizes, barbs, and connections can be used to accommodate the current requirements; various fittings can be used if they can be fitted to the hose of flow line.

A valve used in one or more preferred embodiments of the device or apparatus of the present invention can be any type of vacuum/pressure control valve. In a first preferred, base model embodiment, it is preferably a ¼ turn ball valve with a female end with NPT threads and with a ¼-inch barbed end. Preferably, a ball valve is brass, stainless steel, chrome plated brass, or other material or components that do not readily oxidize or corrode. Different types or sizes of valves can be used and still function properly.

In a second preferred, improved model embodiment, the valve is preferably a bleeder valve with a female end with ¼-inch NPT threads and a male end with ¼-inch NPT threads. Preferably, the valve is chrome plated brass, stainless steel, brass, or other materials or components that will not readily oxidize or corrode. Different types and sizes of valves can be used and still function.

Preferably, a vacuum gauge of a preferred embodiment of the device of the present invention is an oil free dial gauge. Preferably the gauge will be a 2-inch gauge and have a male brass ¼-inch NPT fitting. Gauges of differing measuring systems can work interchangeably. Gauges of varying sizes can be substituted, and function once fitted to the ¼-inch NPT fitting. A commercially available gauge sold under McDaniel controls brand can be used in the present invention.

The present invention also includes a method of testing a one-way valve using one or more preferred embodiments of the device of the present invention, e.g., as described above. The one-way valve allows air to pass one way into a diving helmet, but not back out.

A first preferred method of the present invention, which is considered to be a base model, preferably comprises the following steps:

1. Screw fitting onto one-way valve. Hand tight is sufficient.
2. Close quarter turn ball valve.
3. Squeeze vacuum bulb with hand.
4. Release the bulb and observe. If bulb remains squeezed after removing hand, the test confirms that the one-way valve is operating properly. If bulb does not remain squeezed after removing the hand and applying pressure, this is an indication that the valve is not operating properly. If the bulb does not remain compressed the device indicates an air leak in the one-way/non-return valve.
5. To remove the device following testing, open quarter turn ball valve to equalize pressure and inflate bulb.
6. Unscrew fitting and remove one-way valve tester.

A more preferred method of the present invention, which is considered to be an improved model, preferably comprises the following steps:

1. Screw fitting onto one-way valve. Hand tight is sufficient.
2. Close bleeder valve.
3. Squeeze vacuum bulb with hand. This demonstrates the valve properly opening in the desired direction of air flow. The one-way valve allows air to pass one way into the helmet.
4. Release the bulb and observe. If bulb remains squeezed after removing hand and the vacuum gauge registers a vacuum, the test confirms that the one-way valve is operating properly.
5. To remove the device following testing, open the bleeder valve to equalize pressure and inflate bulb.
6. Unscrew fitting and remove one-way valve tester. After tester is removed, the diver's air or breathing gas supply can be connected.

Another preferred method preferably comprises the following steps:

1. Screw fitting onto one-way or non-return valve. Hand tight is sufficient.
2. Close a valve.
3. Squeeze vacuum bulb with hand.
4. Release the bulb and observe. If bulb remains squeezed after removing hand, the test confirms that the one-way/non-return valve is operating properly. If bulb does not remain squeezed after removing the hand and applying pressure, this is an indication that the valve is not operating properly. If the bulb does not remain compressed the device indicates an air leak in the one-way/non-return valve.
5. To remove the device following testing, open the valve to equalize pressure and inflate bulb.
6. Unscrew fitting and remove one-way or non-return valve tester.

The present invention includes a first preferred embodiment of the apparatus of the present invention, or a base model device, for testing one-way valves for diving, the device preferably comprising:
   (a) a female oxygen fitting;
   (b) a breathing gas hose;
   (c) a gas sampling vacuum bulb;
   (d) a breathing gas hose;
   (e) female NPT fitting; and,
   (f) a ¼ turn ball valve with NPT threads.

The present invention includes a second preferred embodiment of the apparatus of the present invention, or an improved model device for testing one-way valves for diving, the device preferably comprising:
   (a) a female oxygen fitting;
   (b) a breathing gas hose;
   (c) a gas sampling vacuum bulb;
   (d) a breathing gas hose;
   (e) female NPT fitting;
   (f) a bleeder valve; and,
   (g) a vacuum gauge.

In one or more preferred embodiments of the present invention, in a base model device, a female oxygen fitting preferably has a proximal end that is closest to a diver, and a distal end that is preferably opposite the proximal end, and the female oxygen fitting proximal end can be attached to a one-way valve of a diving helmet.

In one or more preferred embodiments of the present invention, a gas sampling vacuum bulb preferably has a proximal end that is closest to the diver, and a distal end that is preferably opposite the proximal end, and the breathing gas hose preferably connects the female oxygen fitting distal end to the gas sampling bulb proximal end.

In one or more preferred embodiments of the present invention, the gas sampling bulb distal end preferably connects to the breathing gas hose proximal end, and the distal end of the breathing gas hose can be attached to the female NPT fitting, and the NPT fitting on the distal end of the breathing gas hose preferably connects to the NPT threads on the ¼ turn ball valve.

In one or more preferred embodiments of the present invention, in the improved model device, the female oxygen fitting preferably has a proximal end that is closest to a diving helmet, and a distal end that is preferably opposite the proximal end, and the female oxygen fitting proximal end can be attached to a one-way valve of a diving helmet.

In one or more preferred embodiments of the present invention, the gas sampling vacuum bulb preferably has a proximal end that is closest to the diving helmet, and a distal end that is preferably opposite the proximal end, and the breathing gas hose preferably connects the female oxygen fitting distal end to the gas sampling bulb proximal end.

In one or more preferred embodiments of the present invention, the gas sampling bulb distal end preferably connects to the breathing gas hose proximal end, and the distal end of the breathing gas hose can be attached to the female NPT fitting, and the NPT fitting on the distal end of the breathing gas hose preferably connects to the NPT threads on the bleeder valve and the vacuum gauge connects to the distal end of the bleeder valve.

In one or more preferred embodiments of the present invention, a female oxygen fitting, NPT fitting, and ¼ turn ball valve are preferably made of brass, stainless steel, chrome plated brass, or other materials that will not readily oxidize or corrode.

In one or more preferred embodiments of the present invention, a fitting is ¼-inch and threads are preferably NPT.

In one or more preferred embodiments of the present invention, a female oxygen fitting preferably has a ¼-inch barb at its distal end.

The present invention includes a method of using the device of the present invention to test a one-way valve of a dive helmet, wherein the gas sampling bulb preferably has a compressed position and an inflated position, the inflated position preferably being the normal or resting position of the bulb, and the compressed position being obtained by squeezing the bulb with normal hand pressure. Preferably, normal hand pressure according to a gauge is a vacuum pressure of about 1 to 16 psi. More preferably, normal hand pressure according to a gauge is a vacuum pressure of about 5 inches of mercury (Hg) (about 2.5 psi).

In one or more preferred embodiments of the present invention, a ball valve preferably has an open position and a closed position, and the bleeder valve preferably has an open and closed position, In one or more embodiments, a method for testing a first preferred embodiment of the apparatus of the present invention, or a first base model, preferably comprises the following steps:

(a) attach the female oxygen fitting to the one-way valve;
(b) move quarter turn ball valve to its closed position;
(c) move vacuum bulb to compressed position by applying normal hand pressure;
(d) remove normal hand pressure from vacuum bulb;
(e) observe vacuum bulb to determine whether it remains in its compressed position without normal hand pressure or returns to its inflated position;
(f) if vacuum bulb remains in compressed position after step (d), the one-way valve is working properly; to remove the device, move quarter turn ball valve to open position to equalize pressure and return bulb to inflated position;
(g) detach fitting and remove device from one-way valve.

In one or more embodiments, a method for testing a second preferred embodiment of the device of the present invention, or an improved model, comprises the following steps:

(a) attach the female oxygen fitting to the one-way valve;
(b) rotate the knob on the bleeder valve to its closed position;
(c) move vacuum bulb to compressed position by applying normal hand pressure;
(d) remove normal hand pressure from vacuum bulb;
(e) observe vacuum bulb to determine whether it remains in its compressed position without normal hand pressure or returns to its inflated position and observe vacuum gauge;
(f) if vacuum bulb remains in compressed position and the vacuum gauge registers a vacuum after step (d), the one-way valve is working properly; to remove the device, rotate the knob on the bleeder valve to open position to equalize pressure and return bulb to inflated position;
(g) detach fitting and remove device from one-way valve.

In one or more preferred embodiments of the present invention, the female oxygen fitting is preferably attached to the one-way valve by screwing the female oxygen fitting onto the one-way valve.

In one or more preferred embodiments of the present invention, hand tightening the fitting onto the one-way valve is preferably sufficient to effectively test the one-way valve of a diving helmet.

In one or more preferred embodiments of the present invention, the apparatus of the present invention further comprises a sealant that is preferably used at locations where the gas sampling bulb distal end connects to the breathing gas hose, and where the breathing gas hose connects to the fittings.

In one or more preferred embodiments of the present invention, the apparatus of the present invention further comprises brass ferrules at locations where the gas sampling bulb distal end connects to the breathing gas hose, and where the breathing gas hose connects to the valve.

In one or more preferred embodiments of the present invention, a sealant is preferably used at locations where the brass ferrules are located.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
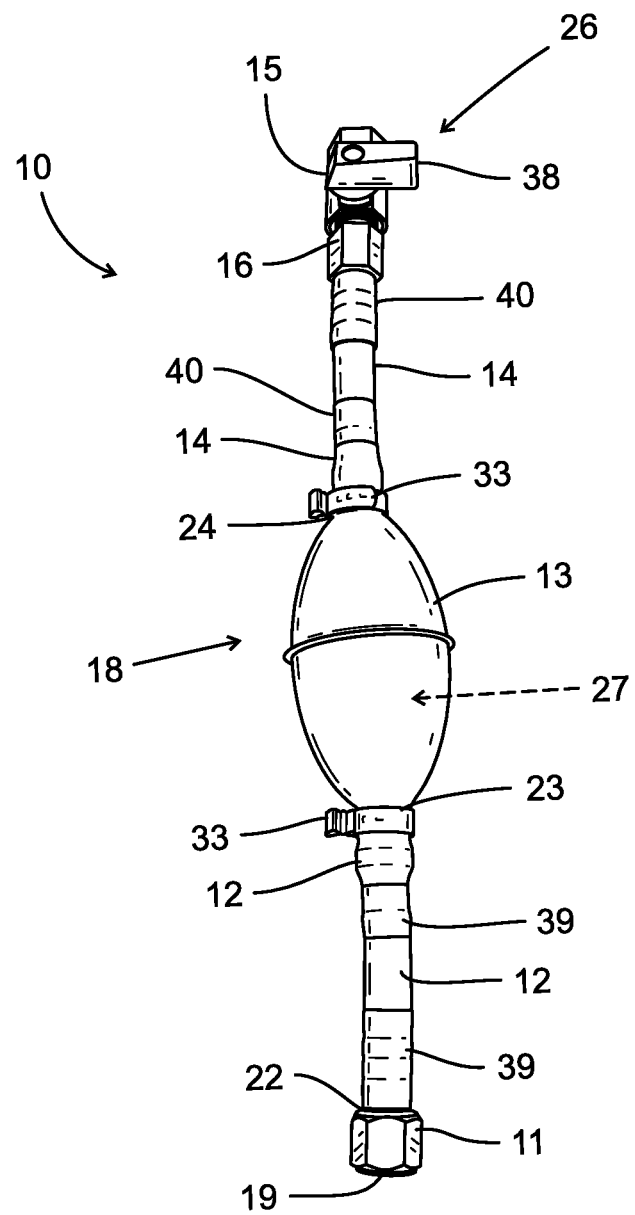
FIG. 1 shows a preferred embodiment of the device of the present invention.
Figure 7:
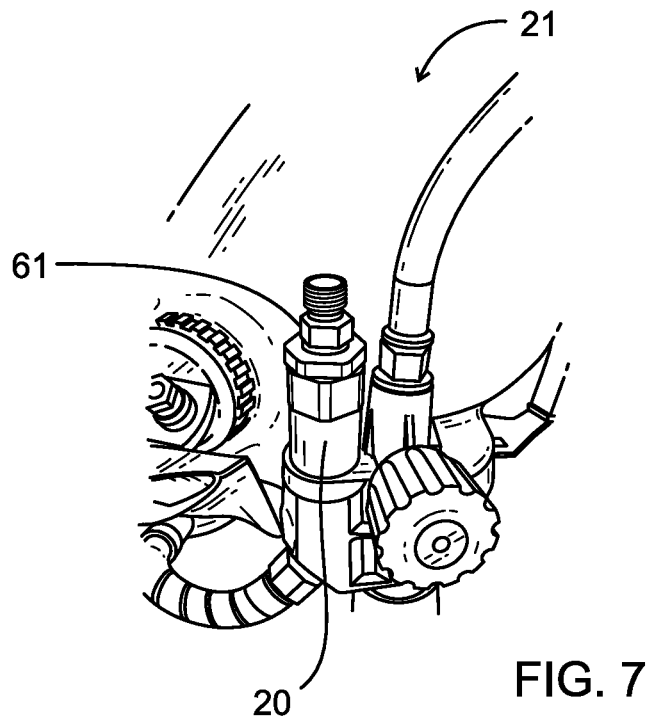
Figure 8:
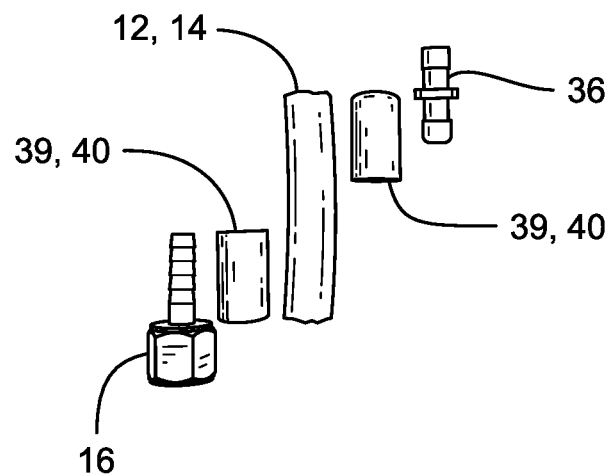
FIGS. 8-13 show various steps in the construction of a preferred embodiment of the device of the present invention.
Figure 9:
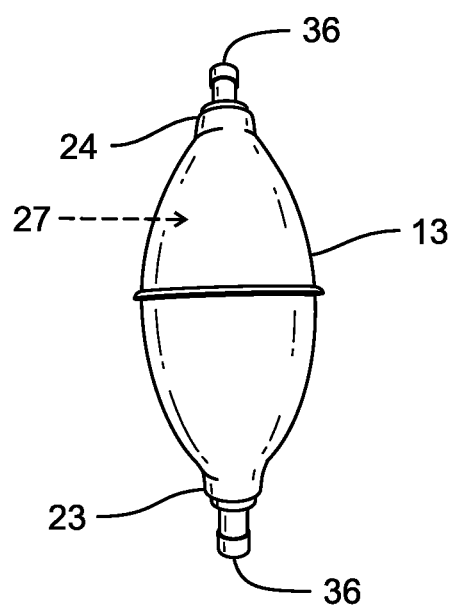
Figure 10:
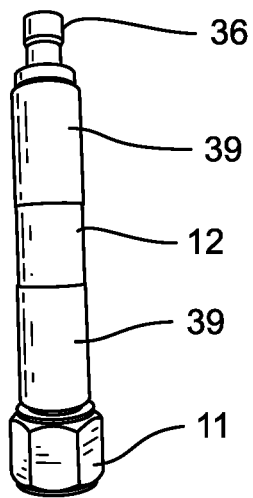
Figure 11:
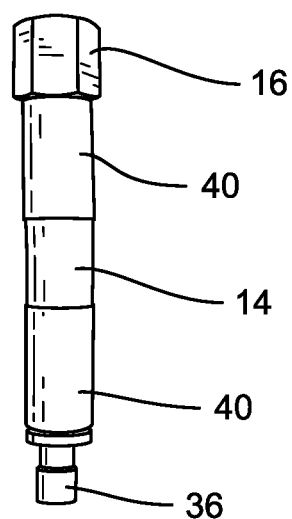
Figure 12:
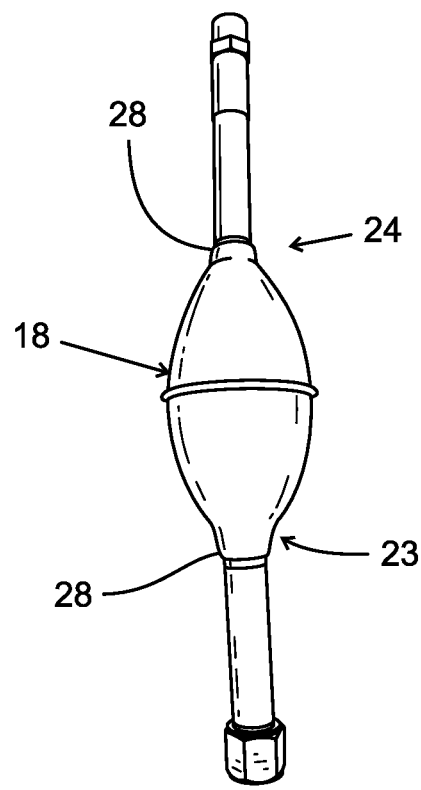

FIG. 1 shows a first preferred embodiment of an apparatus or device of the present invention designated generally by the numeral 10 for testing one-way valves 20 of the present invention (see FIG. 7 for one-way valve 20). As shown in FIG. 1, a device 10 preferably comprises: (a) a female oxygen fitting 11, preferably made of brass; (b) a flow line 12, which can be breathing gas hose; (c) a gas sampling vacuum bulb 13; (d) a flow line 14, which can be a breathing gas hose; (e) a male fitting, which preferably is a barbed male NPT fitting 16 (preferably a NPT fitting 16 is a ¼-inch brass fitting); and (f) a valve 15 which preferably is a ¼ turn ball valve with NPT threads, preferably the threads are ¼-inch NPT and valve 15 is preferably made of brass, stainless steel, chrome plated brass, or other materials or components that do not readily oxidize or corrode. Valve 15 is known and commercially available.

Preferably, female oxygen fitting 11 for attaching to one-way valve 20 has a ¼-inch barb. Other means of attaching the fitting to the hose may be used besides a barbed connection, such as crimped, threaded, or other suitable methods. Preferably, female oxygen fitting 11 is a standard fitting for new dive helmets currently manufactured by most dive companies. Preferably, a breathing gas hose 12 is modifiable to accommodate the other components. A breathing gas hose 12 can be a breathing gas hose such as those manufactured for diving operations, e.g., preferably made of materials safe for use in a breathing system, e.g., Gates 33HB or Gates divers air hose. A blade or knife can be used to cut a flow line or hose 12 to a desired size.

Figure 21:
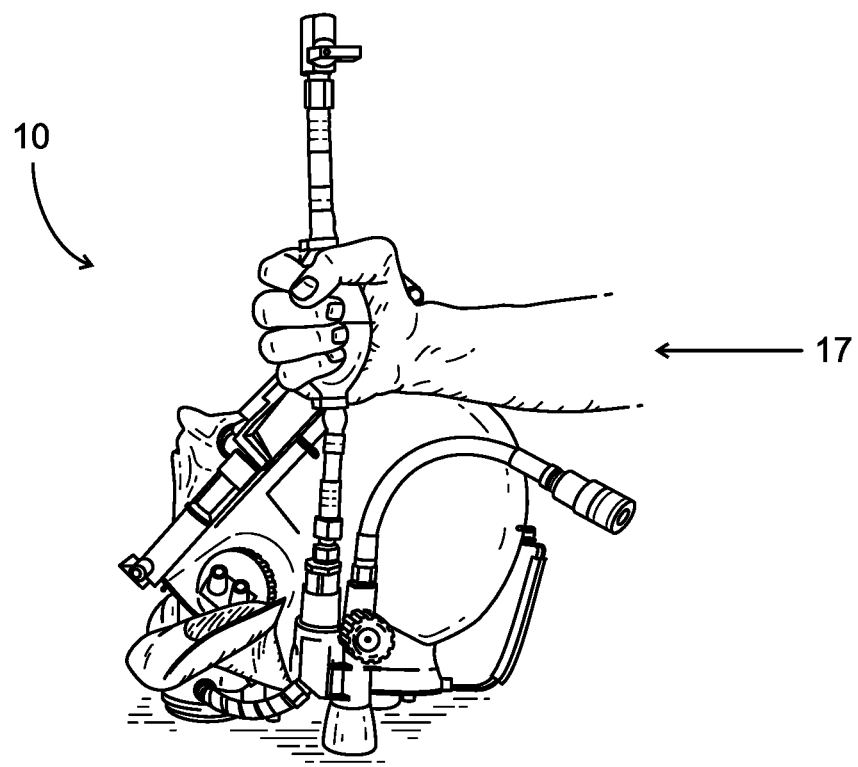
Figure 22:
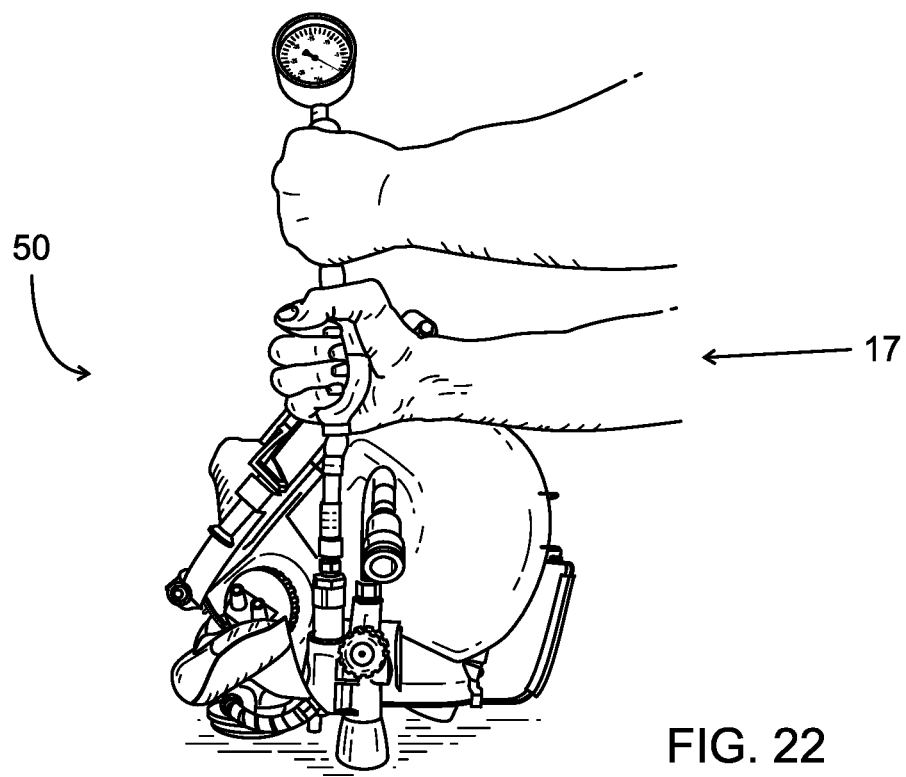
Figure 23:
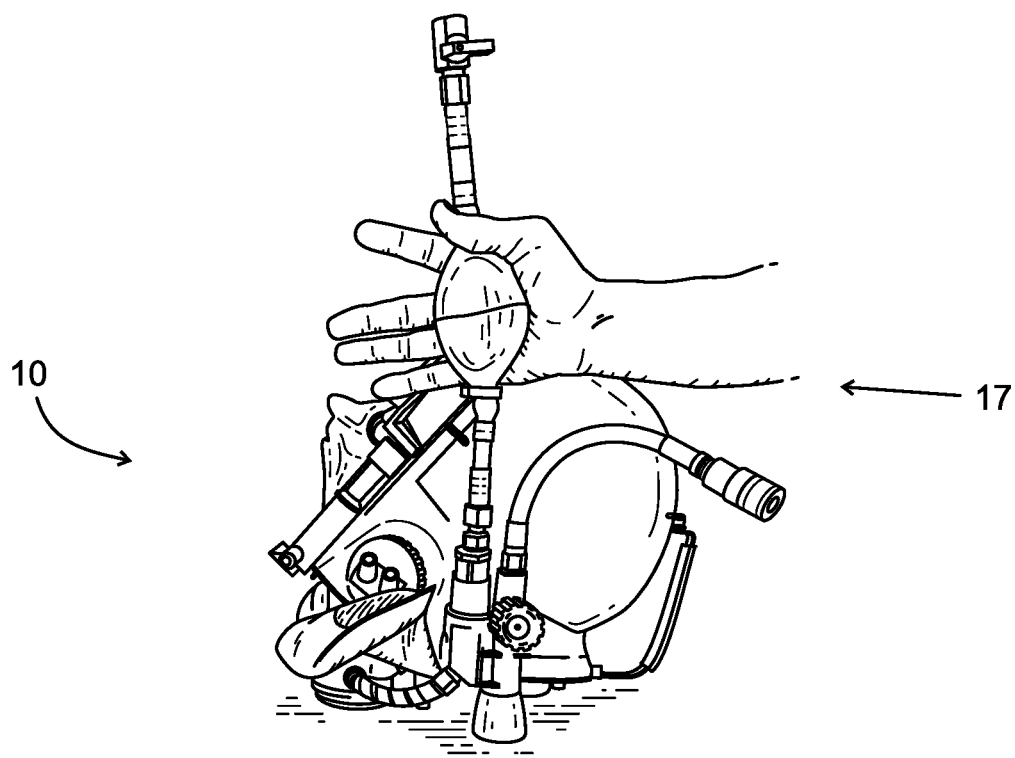
Figure 24:
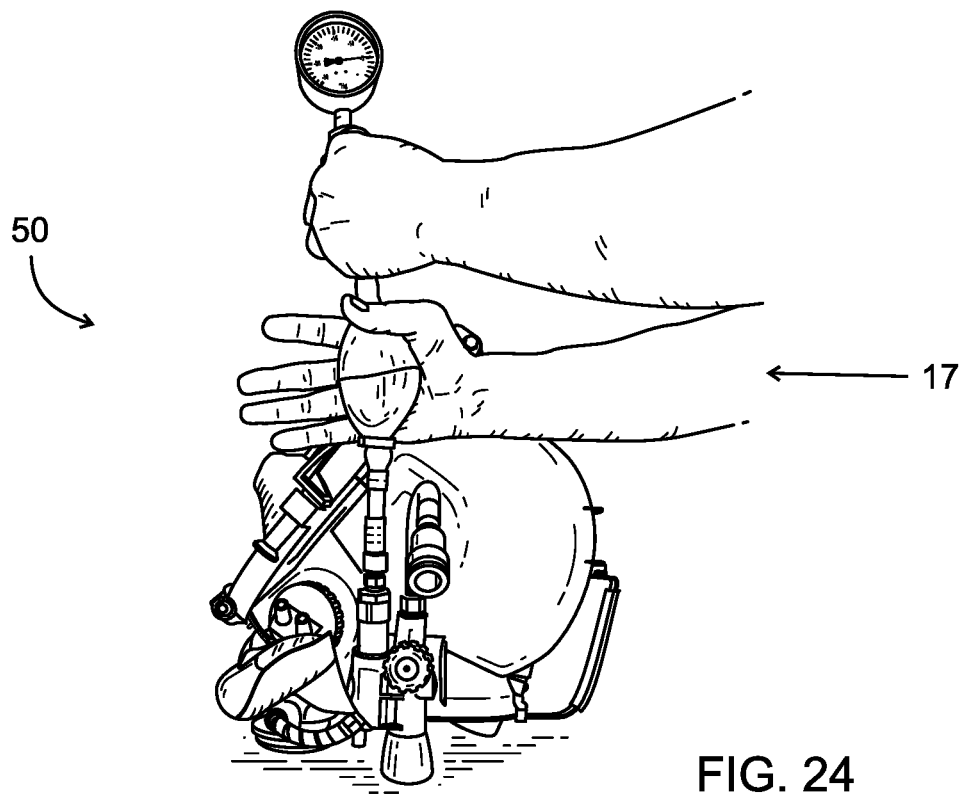

Preferably, a gas sampling vacuum bulb 13 is modifiable to test the non-return valve by taking off end caps 36, removing the internal valves and re-installing end caps 36 as shown in FIGS. 9, 12-13 and 31. A gas sampling vacuum bulb 13 can be a gas sampling vacuum bulb such as those manufactured by Heathrow Scientific. Preferably, bulb 13 has a compressed position 17 (see FIGS. 23-24) and an inflated position 18 (see FIGS. 1, 12), wherein to move bulb 13 from the inflated position 18 to the compressed position 17, a user simply squeezes bulb 13 with their hand (as seen in FIGS. 21-22). Preferably, inflated position 18 is a normal or resting position of bulb 13 as shown in FIG. 1, and bulb 13 will preferably return to inflated position 18 if not attached to another valve or device to keep it in its compressed position 17 once the user releases bulb 13.

Figure 3:
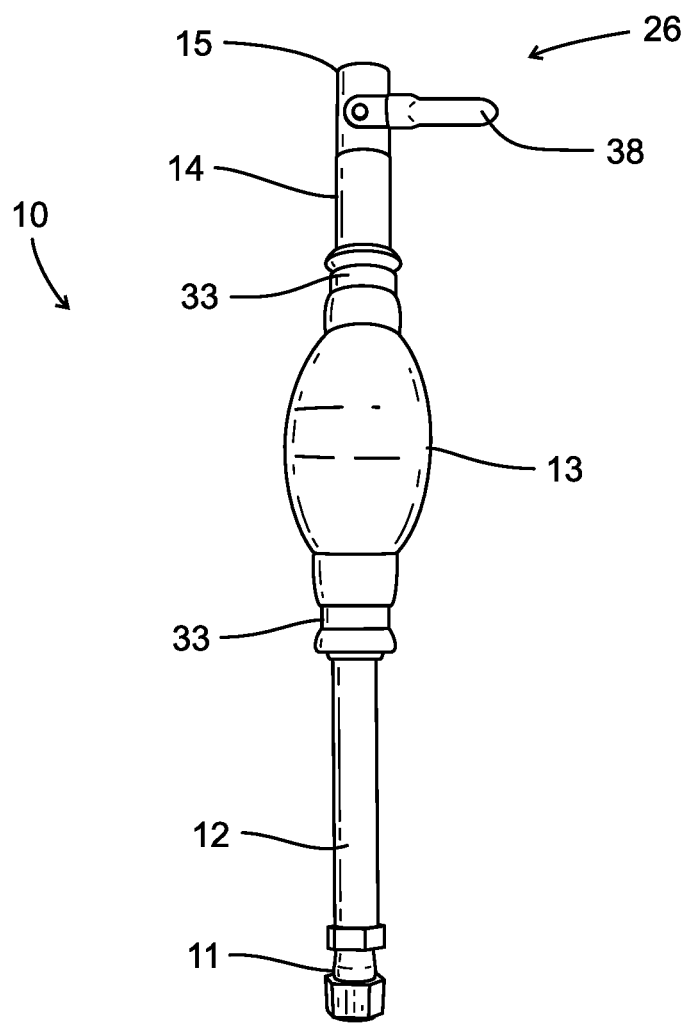
FIG. 3 shows an alternate preferred embodiment of the device of the present invention.
Figure 5:
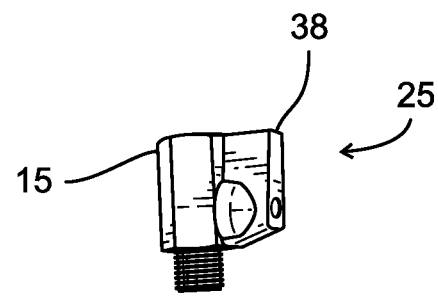
FIG. 5 shows a preferred embodiment of a test valve of a preferred embodiment of the device of the present invention in an open position.
Figure 13:
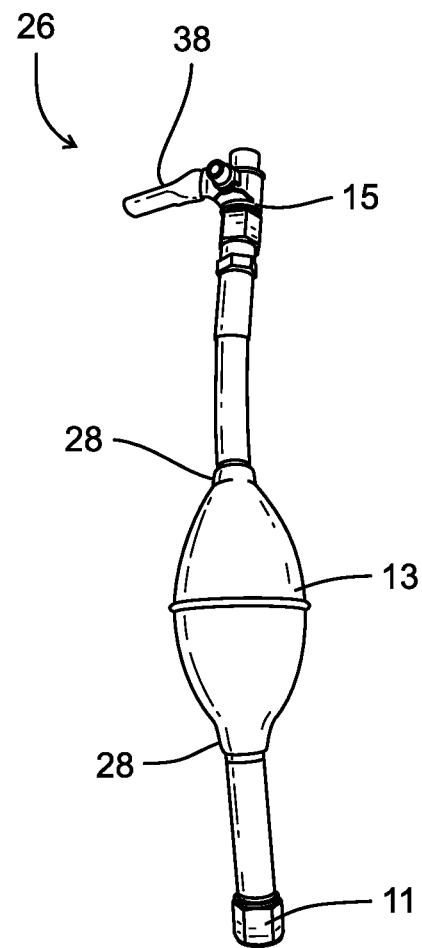

Preferably breathing gas hose with NPT fitting 14 is modifiable to accommodate vacuum bulb 13. Preferably, breathing gas hose 14 can be fitted with an NPT fitting 16, preferably a fitting with a male ¼-inch brass NPT fitting and an end with barbs for attaching the fitting to the breathing gas hose 14. Preferably, a valve 15, e.g., a ¼ turn ball valve with NPT threads, is made of brass and has ¼-inch NPT threads. Preferably, turning the handle or valving member 38 of the valve 15 until it is perpendicular with the body of valve 15, closes valve 15 in a closed position 26, as shown in FIGS. 1, 5 and 13. To open valve 15, the valve 15 handle or valving member 38 can be turned a ¼ turn to the open position 25 wherein the handle or valving member 38 is parallel with the body of the valve 15 (see FIGS. 3, 17).

Preferably, female oxygen fitting 11 has a proximal end 19 that is closest to the diver, and a distal end 22 that is opposite the proximal end 19. The proximal end 19 of the female oxygen fitting 11 can be attached to the male oxygen fitting 61 on the one-way valve 20 of a diving helmet 21, or other attachment device that is suitable.

Preferably, gas sampling vacuum bulb 13 has a proximal end 23 that is closest to a diver, and a distal end 24 that is opposite proximal end 23, and breathing gas hose 12 connects the female oxygen fitting 11 distal end 22 to gas sampling bulb 13 proximal end 23. Preferably, gas sampling bulb 13 distal end 24 connects to breathing gas hose 14, and the NPT fitting 16 attached to breathing gas hose 14 connects to the NPT threads on ¼ turn ball valve 15. Preferably, ball valve 15 has an open position 25 and a closed position 26.

In a preferred embodiment, a sealant 28 (see FIGS. 8-11) can be used at the union between vacuum bulb 13 and hoses 12, 14 on both proximal 23, distal 24 sides to seal an internal seam between bulb 13 and the end pieces of hoses 12, 14. Preferably, a sealant is a Dow Corning RTV 732 multi-purpose sealant or another similar or suitable sealant suitable for use in diving systems. In preferred embodiments, banding or clamps 33 can be used at both proximal 23, distal 24 ends of the bulb 13 to strengthen the joints and provide rigidity against the rigors of the maritime work environment.

In preferred embodiments, brass ferrules 39, 40 can be installed onto the ends of the hoses over the barbed fittings in order to stiffen the joints and prevent flexing and mitigate leaking air at those joints. Preferably, a sealant such as Dow Corning RTV 732 multi-purpose sealant or another similar or suitable sealant is also used at those joints. Embodiments of the present invention including the reinforced joints can be seen in FIGS. 1, 2.

The present invention also includes a method of testing a one-way valve 20 using a device 10 of the present invention described above.

Figure 14:
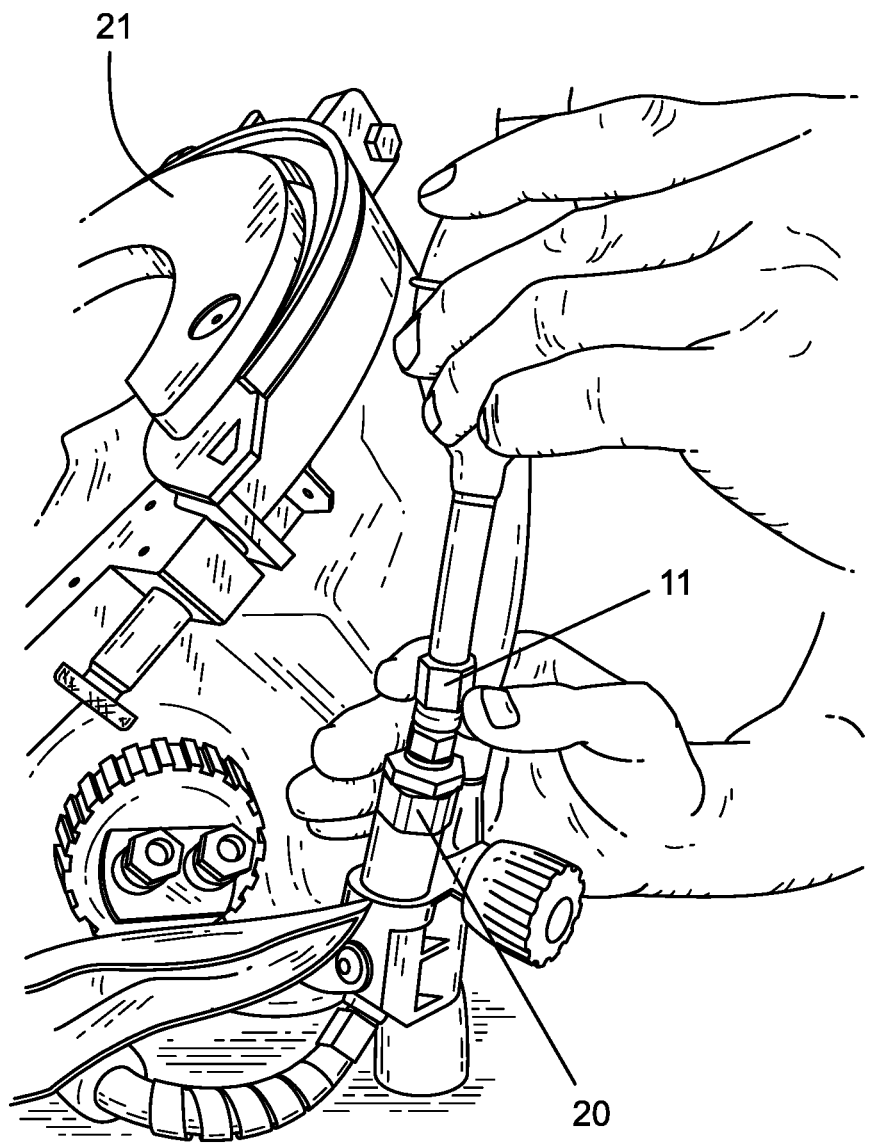
FIGS. 14-28 show various steps in a preferred embodiment of the method of the present invention.
Figure 15:
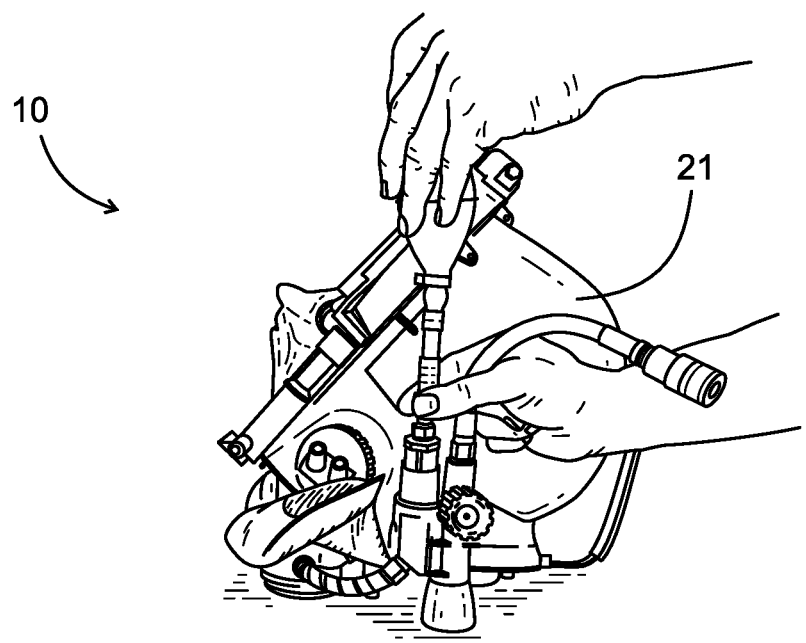
Figure 16:
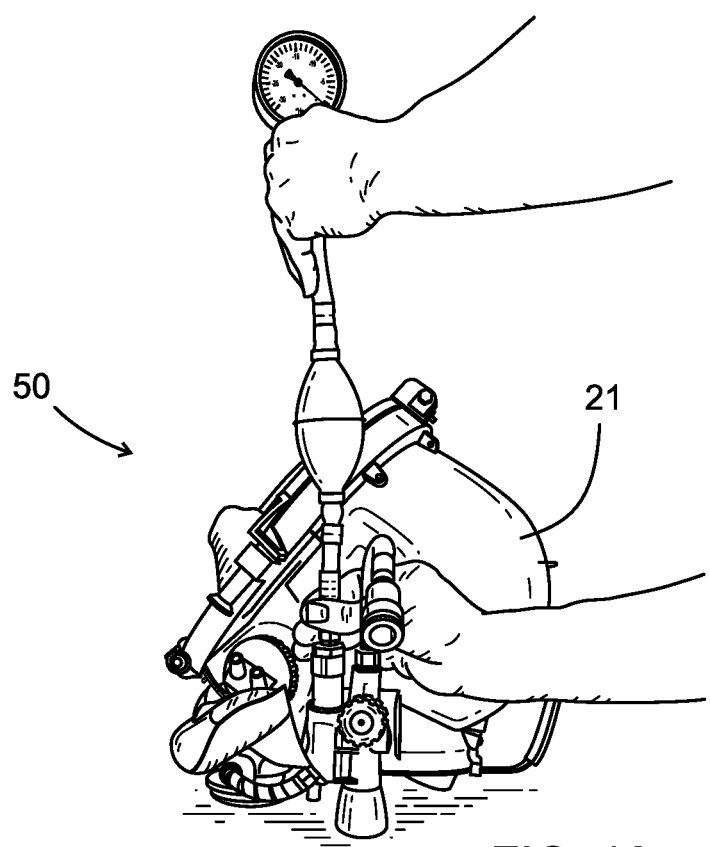

The method preferably comprises the following steps:
(a) Attach fitting 11 onto one-way valve 20. Preferably, attaching to the one-way valve 20 is accomplished by twisting or screwing the parts 11, 20 together. Preferably, hand-tight attachment is sufficient for testing. See for example FIGS. 14-16.

Figure 17:
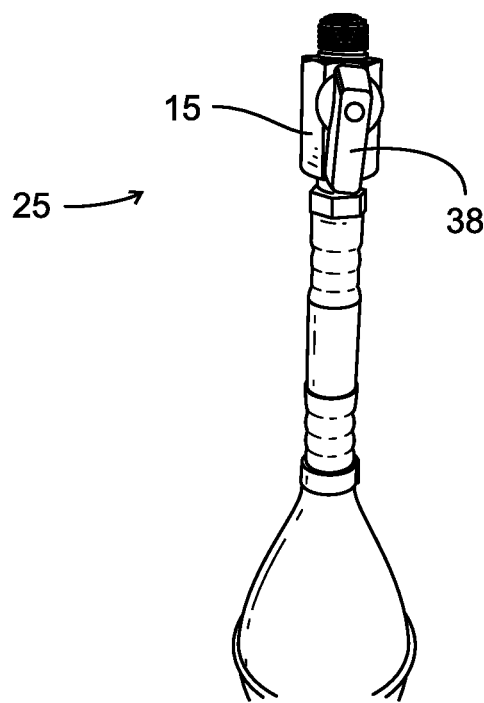
Figure 18:
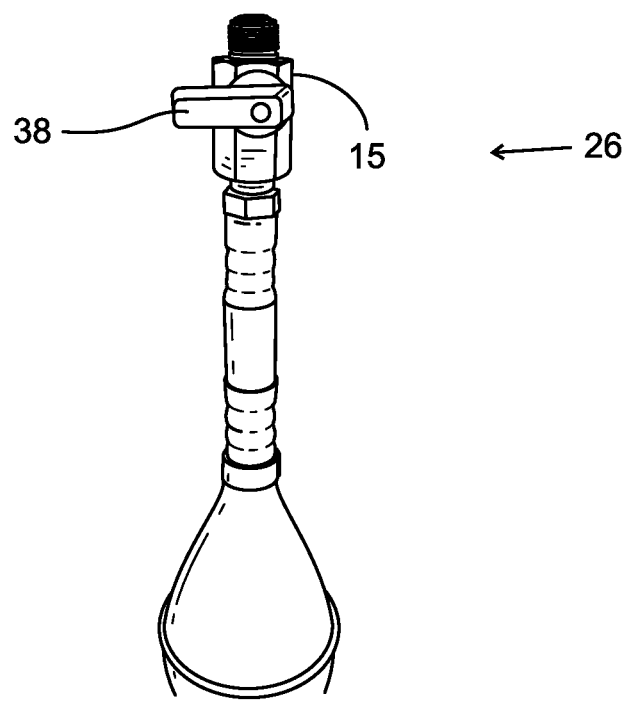
Figure 19:
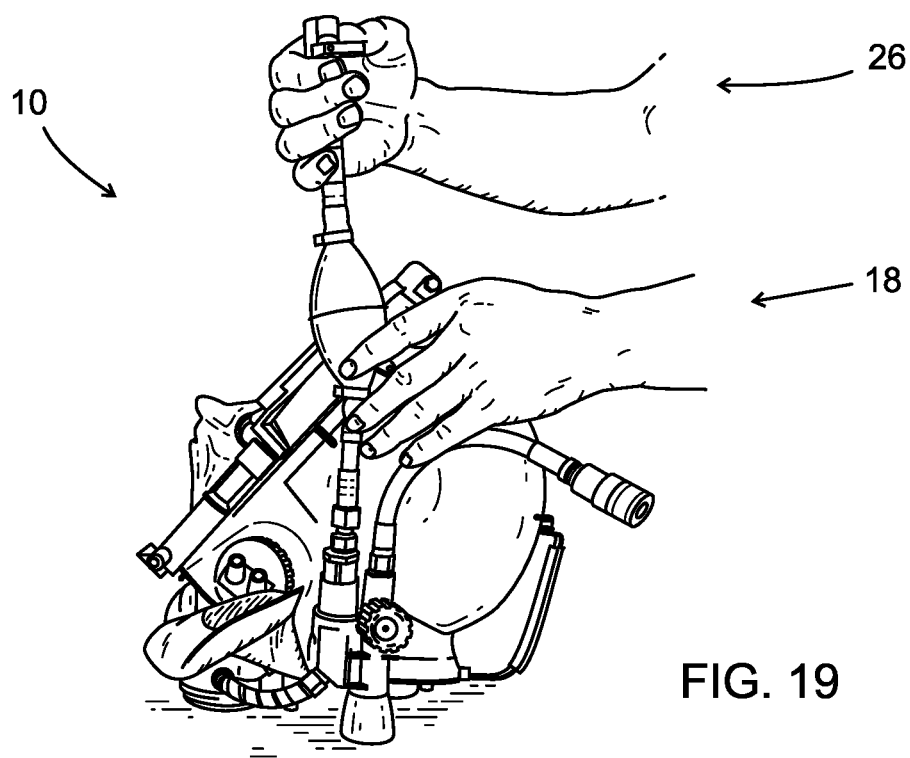

(b) Close quarter turn ball valve 15 from open position 25 to closed position 26, as seen in FIGS. 17-19.

(c) Apply normal hand pressure to squeeze vacuum bulb 13 to compressed position 17, as seen in FIG. 21.

(d) Remove normal hand pressure from bulb 13; if bulb 13 remains in compressed position 17 after removing pressure, the test confirms that the one-way valve 20 is operating properly. See for example FIG. 23.

Figure 25:
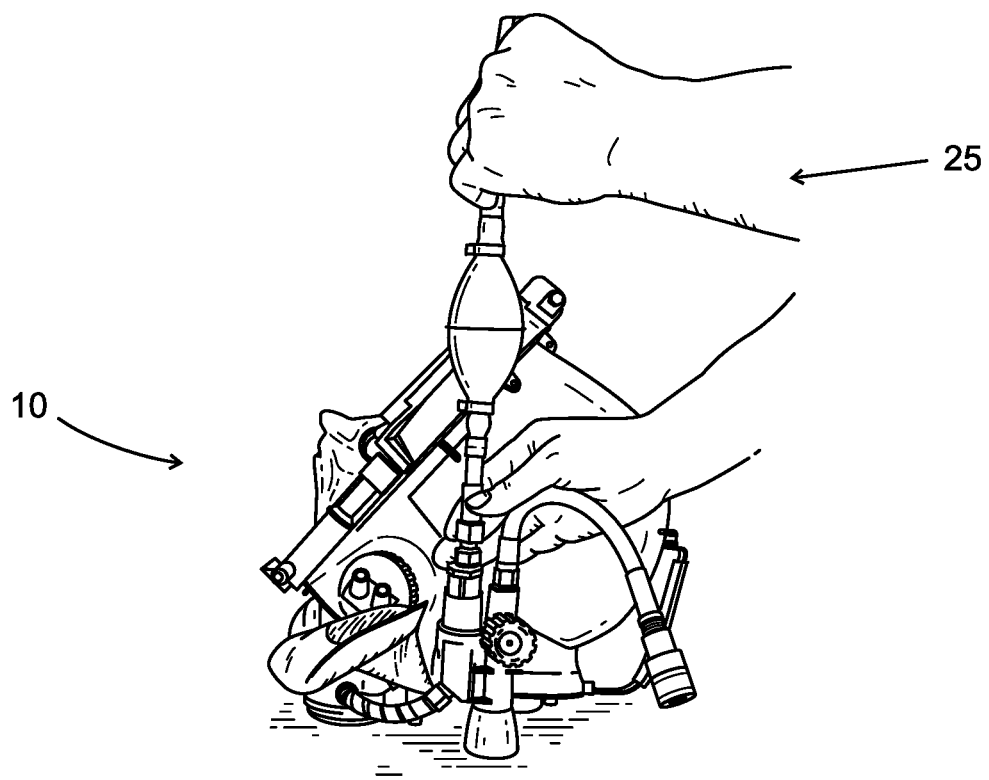

To remove the testing device 10 after the one-way valve 20 is confirmed working in step (d):

(e) Move quarter turn ball valve 15 to open position 25 to equalize pressure and inflate bulb 13, as seen in FIG. 25.

Figure 27:
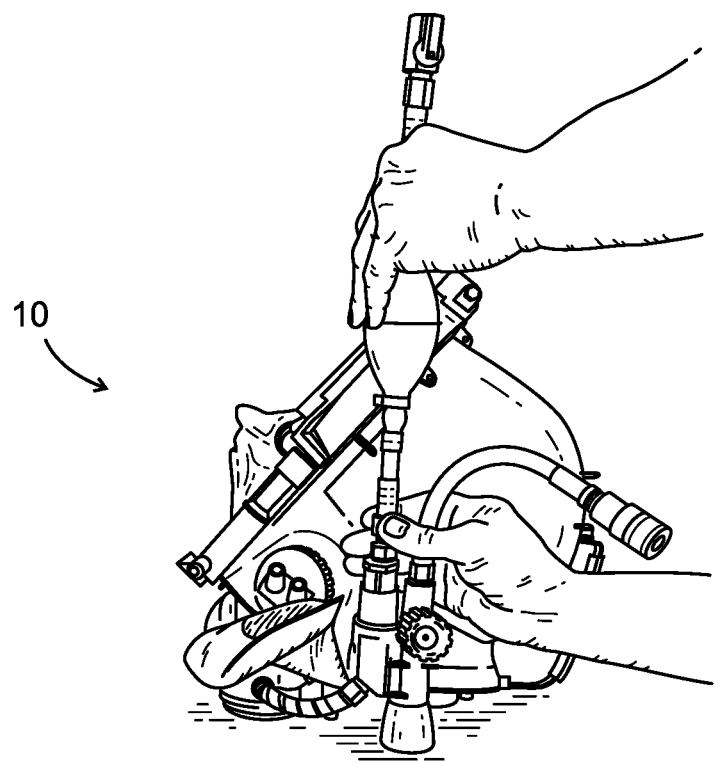

(f) Detach fitting 11 and remove device 10 from one-way valve 20. Preferably, this is done by unscrewing the female oxygen fitting 11 from the one-way valve 20. See, for example, FIG. 27.

Figure 2:
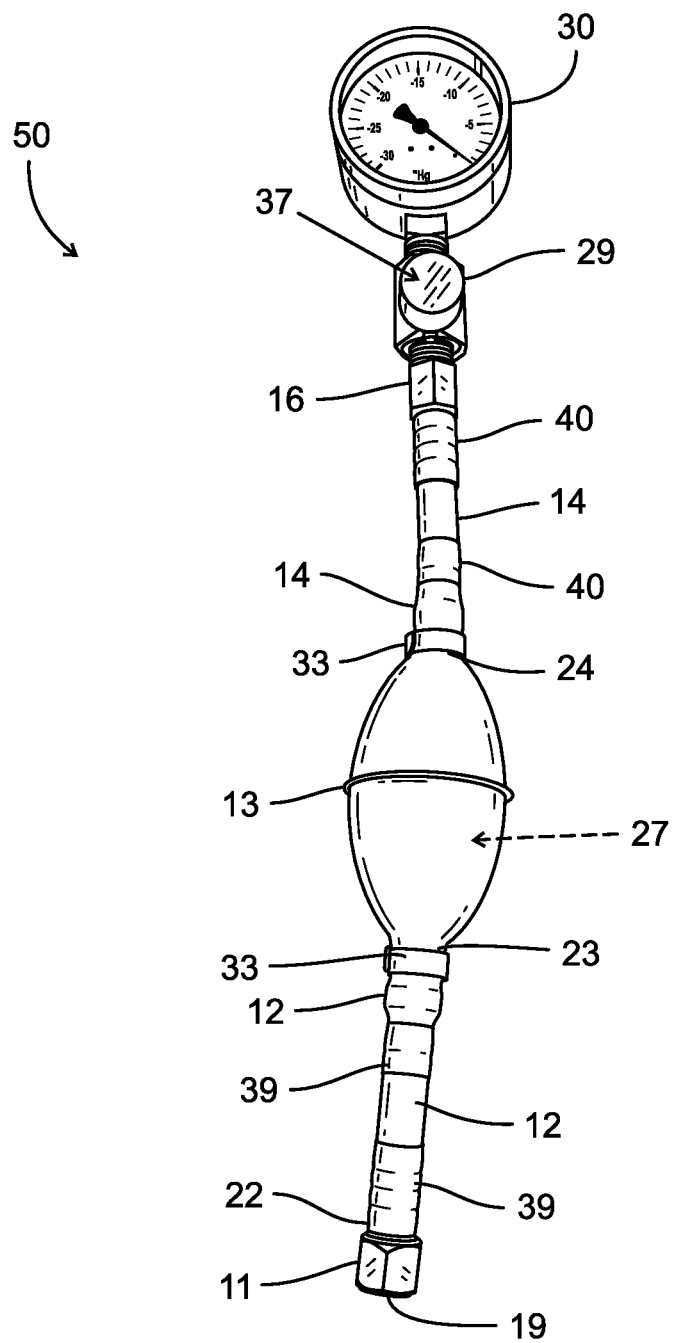
FIG. 2 shows an alternate preferred embodiment of the device of the present invention.
Figure 29:
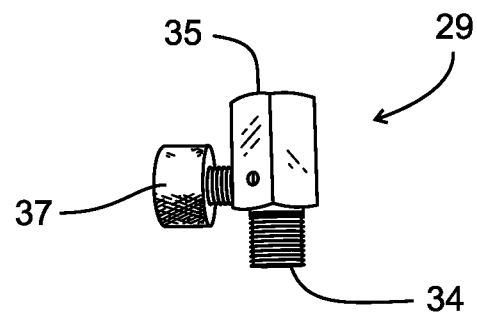
FIG. 29 shows a preferred embodiment of a bleeder valve of the present invention.
Figure 30:
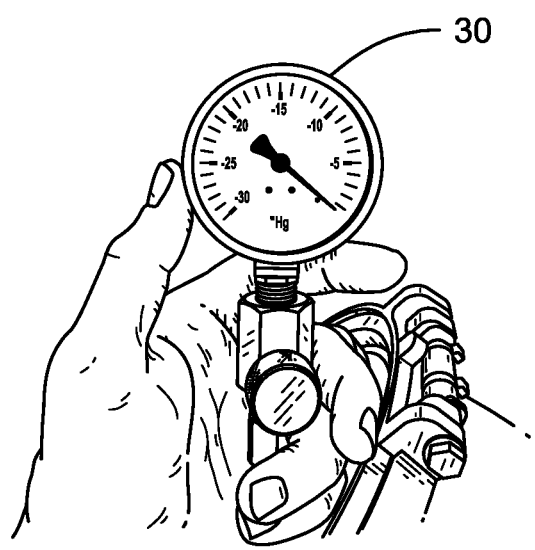
FIG. 30 shows a preferred embodiment of a gauge of the present invention.
Figure 31:
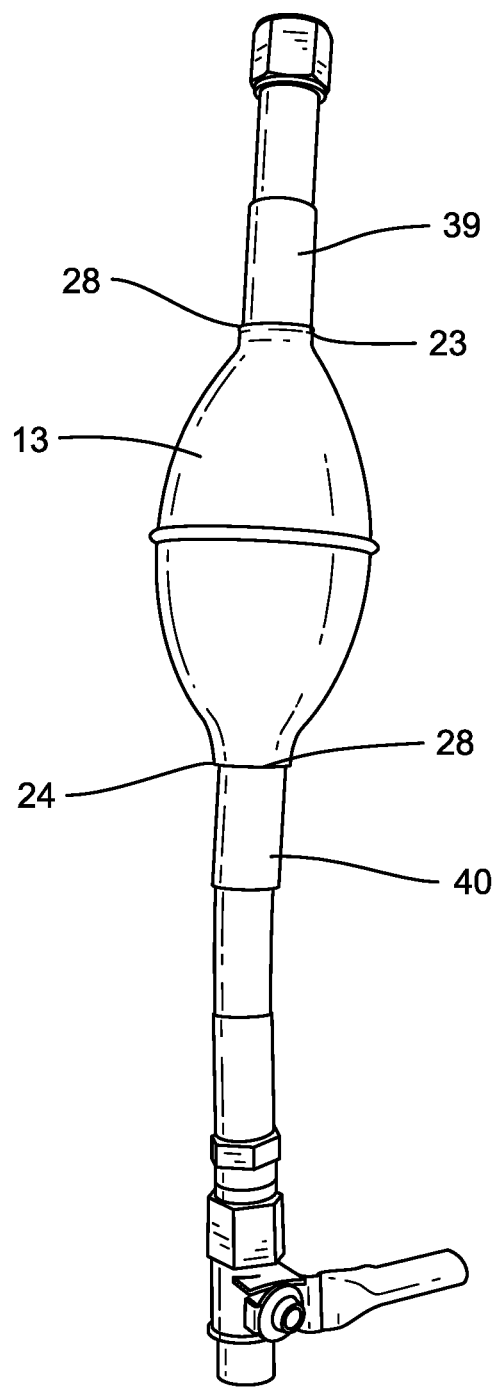
FIG. 31 shows an alternate embodiment of the device of the present invention.

FIG. 2 shows a second preferred embodiment of an apparatus or device of the present invention, sometimes referred to herein as an improved model of the device, designated generally by the numeral 50 for testing one-way valves 20 of the present invention (see FIG. 7 for one-way valve 20). As shown in FIG. 2, a preferred embodiment of a device 50 preferably comprises: (a) a female oxygen fitting 11, preferably made of brass; (b) a flow line 12, which preferably is a breathing gas hose; (c) a gas sampling vacuum bulb 13; (d) a flow line 14, which preferably is breathing gas hose; (e) a male fitting 16 that is preferably a barbed male NPT fitting (preferably the NPT fitting 16 is a ¼-inch brass fitting); (f) a valve 29, which preferably is a bleeder valve with a male proximal end 34, preferably with ¼-inch NPT threads and a female distal end 35, preferably with ¼-inch NPT threads 35 (preferably valve 29 is made of brass, stainless steel, chrome plated brass, or other materials or components that do not readily oxidize or corrode); and (g) a vacuum gauge 30, preferably with ¼-inch NPT threads. (See also FIGS. 29-30). Bleeder valve 29 is known and commercially available.

Figure 6:
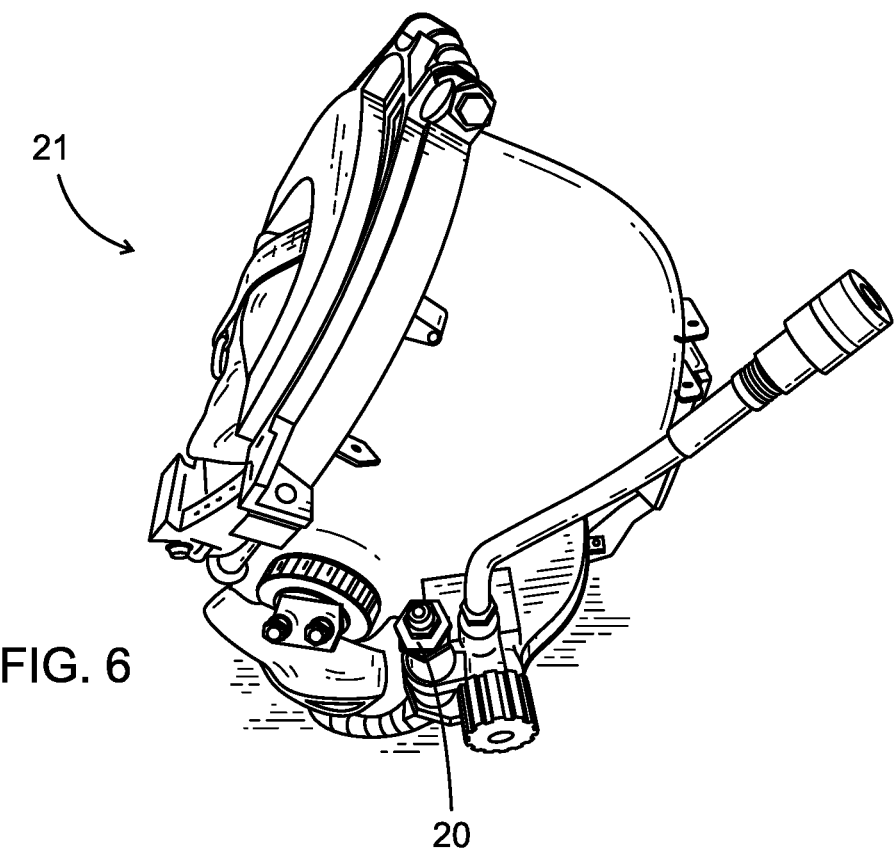
FIGS. 6-7 show various views of a dive helmet that can be used with one or more preferred embodiments of the device of the present invention.

Preferably, female oxygen fitting 11 for attaching to the one-way valve 20 has a ¼-inch barb. Preferably, female oxygen fitting 11 is a standard fitting for new dive helmets currently manufactured by most dive companies (e.g., see FIGS. 6-7). Preferably, a breathing gas hose 12 is modifiable to accommodate the other components. A blade or knife can be used to cut a flow line or gas hose 12 to a desired size. A breathing gas hose 12 can be a breathing gas hose such as those manufactured for diving operations.

Preferably, gas sampling vacuum bulb 13 is modifiable to test non-return valve 20 by taking off end caps 36, removing internal valves and re-installing end caps 36 as shown in FIGS. 9, 12-13, and 31. A gas sampling vacuum bulb 13 can be a gas sampling vacuum bulb such as those manufactured by Heathrow Scientific. Preferably, bulb 13 has a compressed position 17 (see FIG. 24) and an inflated position 18 (see FIGS. 1, 12, 16), wherein to move the bulb 13 from the inflated position 18 to the compressed position 17, a user simply squeezes the bulb 13 with his or her hand (as seen in FIG. 22). Preferably, inflated position 18 is a normal or resting position of bulb 13 as shown in FIG. 1, and bulb 13 can preferably return to inflated position 18 if not attached to another valve or device to keep it in its compressed position 17 once the user releases pressure applied on bulb 13.

Figure 20:
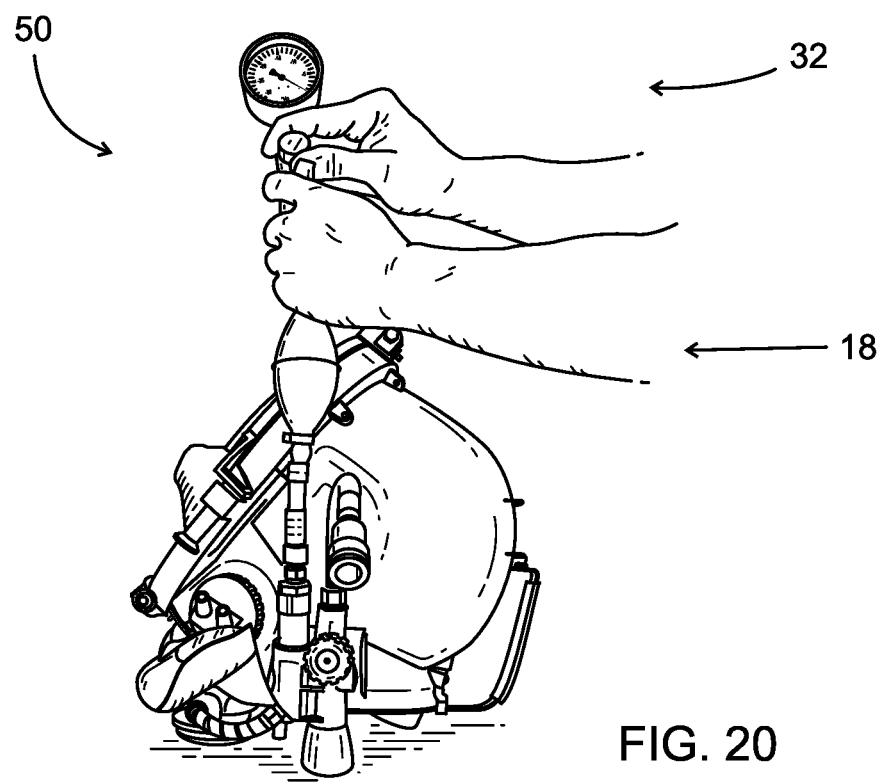

Preferably breathing gas hose 14 with an NPT fitting is modifiable to accommodate vacuum bulb 13. A blade or knife can be used to cut hose 14 to a desired size. Preferably, breathing gas hose 14 will be fitted with an NPT fitting 16, which preferably is a fitting with a male ¼-inch brass NPT fitting and an end with barbs for attaching fitting 16 to breathing gas hose 14. Preferably, a bleeder valve 29 with NPT threads has ¼-inch NPT threads. Preferably, turning knob 37 of the bleeder valve 29 until it is nearest with the body of the valve 29, closes the valve 29 to a closed position 32, as shown in FIG. 20. To open bleeder valve 29 to an open position 31, bleeder valve 29 knob 37 must be turned until knob 37 is farthest from the body of valve 29 (see FIG. 26).

Figure 4:
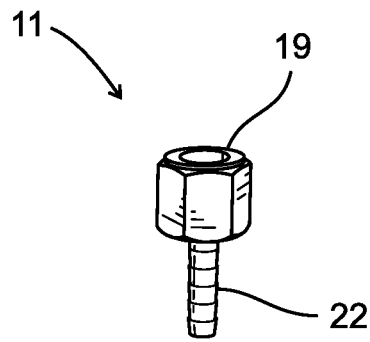
FIG. 4 shows a preferred embodiment of a fitting of the present invention.

Preferably, female oxygen fitting 11 has a proximal end 19 that is closest to the diver, and a distal end 22 that is opposite the proximal end 19, as seen in FIG. 4. The proximal end 19 of the female oxygen fitting 11 can be attached to a male oxygen fitting on a one-way valve 20 of a diving helmet 21, or other attachment device that is suitable.

Preferably, gas sampling vacuum bulb 13 has a proximal end 23 that is closest to a diver, and a distal end 24 that is opposite the proximal end 23, and breathing gas hose 12 connects female oxygen fitting 11 distal end 22 to gas sampling bulb 13 proximal end 23. Preferably, gas sampling bulb 13 distal end 24 connects to breathing gas hose 14, and NPT fitting 16 attached to breathing gas hose 14 connects to NPT threads on bleeder valve 29. Preferably, bleeder valve 29 has an open position 31 and a closed position 32.

In preferred embodiments, a sealant 28 is used at the union between a vacuum bulb 13 and hose 12, 14 on both proximal 23, distal 24 ends to seal the internal seam between the bulb and the end piece of hose 12, 14. Preferably, a sealant 28 is Dow Corning RTV 732 multi-purpose sealant or another similar or suitable sealant suitable for use in diving systems. In preferred embodiments banding or clamps 33 can be used at both ends of the bulb 23, 24 to strengthen the joints and provide rigidity against the rigors of the maritime work environment.

In preferred embodiments, brass ferrules 39, 40 can be installed onto ends of the hoses 12, 14 over barbed fittings 11, 16 in order to stiffen the joints and prevent flexing and mitigate leaking air at those joints. Preferably, a sealant such as Dow Corning RTV 732 multi-purpose sealant or another similar or suitable sealant is also used at those joints. This embodiment including the reinforced joints can be seen in FIG. 2.

The present invention also includes a method of testing a one-way valve 20 using device 50 of the present invention, e.g., as described above.

The method preferably comprises the following steps:

(a) Attach fitting 11 onto one-way valve 20. Preferably, attaching to the one-way valve 20 is accomplished by twisting or screwing the parts 11, 20 together. Preferably, hand-tight attachment is sufficient for testing. See for example FIGS. 14-16.

(b) Rotate knob 37 to close bleeder valve 29 in a closed position 32, as seen in FIG. 20.

(c) Apply normal hand pressure to squeeze vacuum bulb 13 to compressed position 17, as seen in FIG. 22.

(d) Remove normal hand pressure from bulb 13; if bulb 13 remains in compressed position 17 after removing pressure and the vacuum gauge 30 registers a vacuum, and the test confirms that the one-way valve 20 is operating properly. See for example FIG. 24 . Preferably, if the gauge 30 registers a vacuum and bulb 13 remains compressed, the one-way valve 20 is functioning correctly. Preferably, for example, an average hand pressure can be about 5 inches of mercury, or 5"Hg, which registers on gauge 30.

If in step (d) bulb 13 does not remain compressed after removing pressure and/or vacuum gauge 30 does not register a vacuum, this is an indication that one-way valve 20 is not operating properly.

Figure 26:
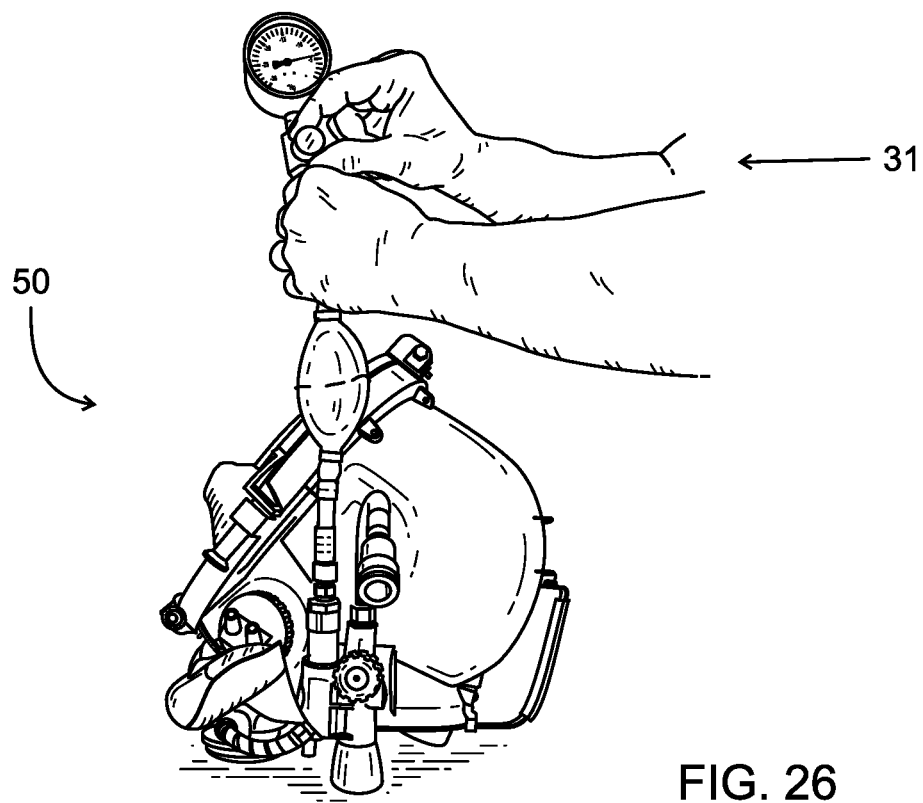

To remove the testing device 50, e.g., after the one-way valve 20 is confirmed working in step (d):

(e) Rotate knob 37 on bleeder valve 29 to open position 31 to equalize pressure and inflate bulb 13, as seen in FIG. 26.

Figure 28:
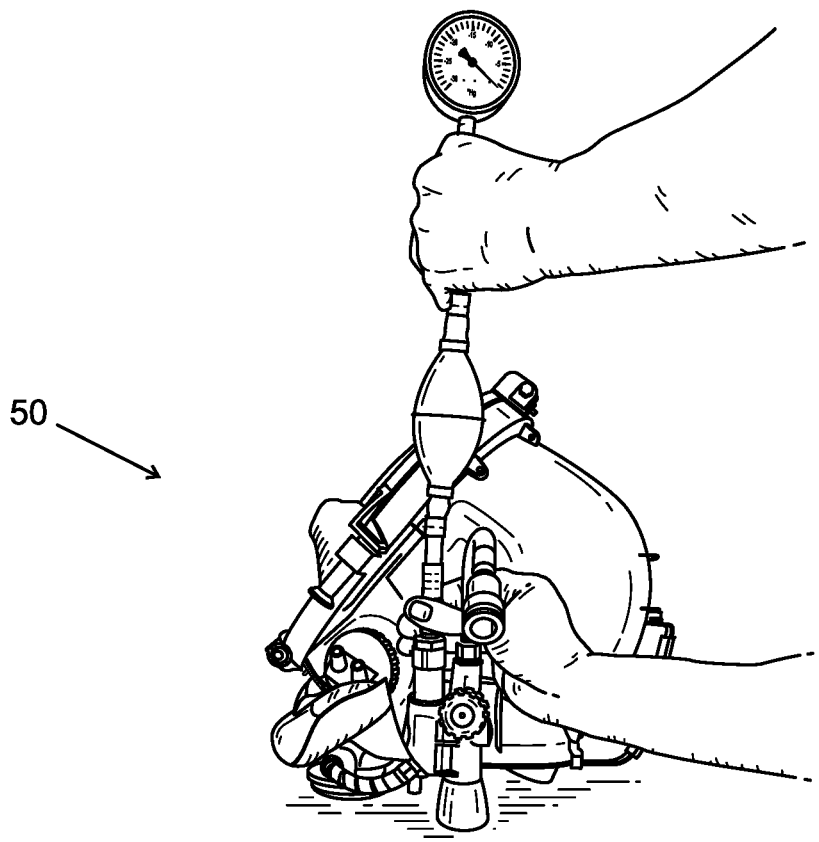

(f) Detach fitting 11 and remove device 50 from one-way valve 20. Preferably, this is done by unscrewing the female oxygen fitting 11 from the one-way valve 20. See, for example, FIG. 28.

A preferred embodiment of the present invention includes an apparatus 10 for testing a one-way or non-return valve 20 on an underwater diving helmet 21. Preferably, the apparatus 10 comprises:

a) a fitting 11 that is connectable to a one-way or non-return valve 20 of an underwater diving helmet 21 that is to be tested;

b) a compressible bulb 13 having an air containing interior 27, a bulb air inlet 23 and a bulb air outlet 24;

c) a first flow line 12 between said fitting 11 and said bulb 13;

d) a second flow line 14 extending from said bulb 13 air outlet 24;

e) a test valve 15 in said second flow line 14, said valve 15 having a valving member 38 (see FIG. 31) that is movable between open 25 and closed 26 positions;

f) during proper one-way valve function, air is unable to flow from the one-way or non-return valve 20 to the test valve 15 via the fitting 11, flow lines 12, 14 and bulb 13;

g) wherein said bulb 13 is movable between relaxed 18 and compressed 17 positions; and h) wherein when said bulb 13 is moved from the relaxed 18 to the compressed 17 position and said test valve 15 is in the closed position 26, the one-way or non-return valve 20 is functioning properly if the bulb 13 does not return to the relaxed position 18.

Preferably, compressible bulb 13 is manually operable by a user wherein a user's hand applied pressure effects movement of the bulb 13 from the relaxed 18 to the compressed 17 position.

In some preferred embodiments, the apparatus of present invention 50 is similar to an apparatus of the present invention 10 and further comprises a pressure gauge 30 that monitors air pressure between said fitting 11 and a said test valve 29. Preferably, gauge 30 registers a vacuum if the one-way or non-return valve 20 is functioning properly. Preferably, opening the test valve 29 to the open position 31 enables removal of the vacuum.

Preferably, the one-way or non-return valve 20 on a helmet 21 normally functions to stop air from escaping and creating a vacuum in the diver's helmet 21. The one-way valve 20 can also function to prevent loss of the diver's emergency gas supply (EGS) should the dive hose be severed or disconnected.

Preferably, the fitting 11 includes a threaded portion or connection 19 and the fitting 11 attaches to the one-way or non-return valve 20 with a threaded connection 19.

In a preferred embodiment, the present invention 10 further includes a first ferrule 39 between said bulb 13 and said fitting 11. More preferably, the present invention 10 further includes a second ferrule 40 between said bulb 13 and said test valve 15. Preferably, the first ferrule 39 is in between said first flow line 12 and the bulb 13. Preferably, the second ferrule 40 is in between said bulb 13 and said second flow line 14. Preferably, the first ferrule 39 is connected to said bulb 13 air outlet 24. Preferably, the second ferrule 40 is connected to said bulb 13 air inlet 23.

The present invention preferably includes a method of testing a one-way or non-return valve 20 on an underwater diving helmet 21, using the apparatus of the present invention 10. This method preferably comprises the steps of:
  a) providing a testing manifold 10 that includes:
    i) a fitting 11 that is connectable to a one-way or non-return valve 20 of an underwater diving helmet 21 that is to be tested;
    ii) a compressible bulb 13 having an air containing interior 27, a bulb air inlet 23 and a bulb air outlet 24;
    iii) a first flow line 12 between said fitting 11 and said bulb 13;
    iv) a second flow line 14 extending from said bulb 13 air outlet 24;
    v) a test valve 15 in said second flow line 14, said valve 15 having a valving member 38 that is movable between open 25 and closed 26 positions;
    vi) during proper one-way valve function, air is unable to flow from the one-way or non-return valve 21 to the test valve 15 via the fitting 11, flow lines 12, 14 and bulb 13; and wherein in the closed position, air is unable to flow into/out of the one way valve tester through the test valve;
    vii) wherein said bulb 13 is movable between relaxed 18 and compressed 17 positions; and
    viii) wherein when said bulb 13 is moved from the relaxed 18 to the compressed 17 position and said test valve 15 is in the closed position 26, the one-way or non-return valve 21 is functioning properly if the bulb 13 does not return to the relaxed position 18.
  b) attaching the manifold of step "a" to the one-way or non-return valve 20 to be tested by connecting the fitting 11 to the one-way or non-return valve 20;
  c) closing the test valve 15;
  d) compressing the bulb 13 to move the bulb 13 to the compressed position 17; and
  e) wherein the bulb 13 remaining in the compressed position 17 of step "c" indicates that the one-way or non-return valve 20 to be tested is operating properly.

Preferably, in step "d" a user manually compresses the bulb 13. Preferably, in step "d" air is pumped into the helmet 21 via the one-way or non-return valve 20 that is being tested.

The present invention preferably includes a method of testing a one-way or non-return valve 20 on an underwater diving helmet 21, using the apparatus of the present invention 50. This method preferably comprises the steps of:
  a) providing a testing manifold 50 that includes:
    i) a fitting 11 that is connectable to a one-way or non-return valve 20 of an underwater diving helmet 21 that is to be tested;
    ii) a compressible bulb 13 having an air containing interior 27, a bulb air inlet 23 and a bulb air outlet 24;
    iii) a first flow line 12 between said fitting 11 and said bulb 13;
    iv) a second flow line 14 extending from said bulb 13 air outlet 24;
    v) a test valve 29 in said second flow line 14, said valve 29 having a valving member 37 that is movable between open 31 and closed 32 positions;
    vi) wherein in the closed position 32, air is unable to flow from the one-way or non-return valve 21 to the test valve 29 via the fitting 11, flow lines 12, 14 and bulb 13;
    vii) wherein said bulb 13 is movable between relaxed 18 and compressed 17 positions; and
    viii) wherein when said bulb 13 is moved from the relaxed 18 to the compressed 17 position and said test valve 15 is in the closed position 32, the one-way or non-return valve 21 is functioning properly if the bulb 13 does not return to the relaxed position 18.
  b) attaching the manifold of step "a" to the one-way or non-return valve 20 to be tested by connecting the fitting 11 to the one-way or non-return valve 20;
  c) closing the test valve 29;
  d) compressing the bulb 13 to move the bulb 13 to the compressed position 17; and
  e) wherein the bulb 13 remaining in the compressed position 17 of step "c" indicates that the one-way or non-return valve 20 to be tested is operating properly.

Preferably, in step "d" a user manually compresses the bulb 13. Preferably, in step "d" air is pumped into the helmet 21 via the one-way or non-return valve 20 that is being tested.

In preferred embodiments of the method of using a testing manifold 10, 50, if in step (e) bulb 13 does not remain in compressed position 17, this indicates that the one-way or non-return valve 20 is not operating properly and air may be passing through.

In some preferred embodiments, the manifold further comprises a pressure gauge 30 that monitors air pressure between said fitting 11 and said test valve 15, 29, e.g., in a test manifold 50. Preferably, the gauge 30 registers a vacuum if the one-way or non-return valve 20 is functioning properly. Preferably, opening the test valve 15, 29 to the open position 25, 31 enables removal of the vacuum. In these embodiments, the method of testing preferably further comprises a step of monitoring the pressure gauge 30.

If the one-way or non-return valve 20 is operating properly in step "e" the helmet 21 can be used for diving.

PARTS LIST

The following is a list of parts and materials suitable for use in the present invention:

| Parts Number | Description |
| --- | --- |
| 10 | apparatus or device of the present invention/testing manifold |
| 11 | oxygen fitting |
| 12 | flow line/breathing gas hose |
| 13 | gas sampling vacuum bulb |
| 14 | flow line/breathing gas hose/breathing gas hose with NPT fitting |
| 15 | valve/ball valve/¼turn ball valve with NPT threads/test valve |
| 16 | NPT fitting |
| 17 | compressed position |
| 18 | inflated position/relaxed position |
| 19 | proximal end of fitting 11/threaded connection or portion |
| 20 | one-way valve |
| 21 | diving helmet |
| 22 | distal end of fitting 11 |
| 23 | proximal end/inlet of bulb 13 |
| 24 | distal end/outlet of bulb 13 |
| 25 | open position of valve 15 |
| 26 | closed position of valve 15 |
| 27 | bulb 13 interior/hollow interior |
| 28 | sealant |
| 29 | valve/bleeder valve/test valve |
| 30 | vacuum gauge |
| 31 | open position of bleeder valve/test valve 29 |

-continued

| Parts Number | Description |
| --- | --- |
| 32 | closed position of bleeder valve/test valve 29 |
| 33 | clamps or banding |
| 34 | proximal end/male end of bleeder valve |
| 35 | distal end/female end of bleeder valve |
| 36 | bulb 13 end caps |
| 37 | knob/bleeder valve knob/valving member |
| 38 | valving member or handle of valve 15 |
| 39 | first ferrule |
| 40 | second ferrule |
| 50 | apparatus or device of the present invention/testing manifold |
| 61 | male oxygen fitting |

All measurements disclosed herein are at standard temperature and pressure, at sea level on Earth, unless indicated otherwise. All materials used or intended to be used in a human being are bio-compatible, unless indicated otherwise.

The foregoing embodiments are presented by way of example only; the scope of the present invention is to be limited only by the following claims.

The invention claimed is:

1. An apparatus for testing a one-way or non-return valve on an underwater diving helmet, comprising:
   a) a manifold that includes a fitting that is connectable to a male oxygen fitting that is connected to the one-way or non-return valve of the underwater diving helmet that is to be tested;
   b) the manifold including a compressible bulb having a bulb interior, a bulb air inlet and a bulb air outlet;
   c) a first flow line directly connecting said fitting and said bulb air outlet;
   d) a second flow line extending from said bulb air inlet;
   e) said second flow line having a test valve, said test valve having a valving member that is movable between open flow and closed flow positions;
   f) wherein in the closed flow position, air is unable to flow into or out of the test valve into the manifold;
   g) wherein said bulb is movable between relaxed and compressed positions, the compressed position forming a vacuum in said bulb interior;
   h) wherein when said bulb is moved from the relaxed position to the compressed position and said test valve is in the closed flow position, the one-way or non-return valve is functioning properly if the bulb maintains a vacuum on said test valve and does not return to the relaxed position thus providing a visual confirmation of proper function of said one-way or non-return valve; and
   i) wherein when said bulb is moved from the relaxed position to the compressed position and said test valve is in the closed flow position, the one-way or non-return valve is not functioning properly if air flows from the one-way or non-return valve to the bulb removing said vacuum and the bulb moves from the compressed to the relaxed position.

2. The apparatus of claim 1 wherein the compressible bulb is manually operable by a user wherein a user's hand applied pressure effects movement of the bulb from the relaxed position to the compressed position.

3. The apparatus of claim 1 further comprising a pressure gauge that monitors air pressure between said fitting and said test valve.

4. The apparatus of claim 1 wherein the one-way or non-return valve on the helmet normally functions as a check valve on the helmet.

5. The apparatus of claim 1 wherein the fitting includes a threaded portion and the fitting attaches to the male oxygen fitting with a threaded connection.

6. The apparatus of claim 3 wherein the gauge registers a vacuum if the one-way or non-return valve is functioning properly.

7. The apparatus of claim 6 wherein opening the test valve to the open flow position enables removal of the vacuum.

8. The apparatus of claim 1 further comprising a first ferrule between said bulb and said fitting.

9. The apparatus of claim 1 further comprising a second ferrule between said bulb and said test valve.

10. The apparatus of claim 8 wherein said first ferrule is in between said first flow line and said bulb.

11. The apparatus of claim 9 wherein said second ferrule is in between said bulb and said second flow line.

12. The apparatus of claim 8 wherein said first ferrule is connected to said bulb air outlet.

13. The apparatus of claim 9 wherein said second ferrule is connected to said bulb air inlet.

14. A method of testing a one-way or non-return valve on an underwater diving helmet, comprising the steps of:
   a) providing a testing manifold that includes:
      i) a fitting that is connectable to the one-way or non-return valve of the underwater diving helmet that is to be tested;
      ii) a compressible bulb having an air containing interior, a bulb air inlet and a bulb air outlet;
      iii) a first flow line between said fitting and said bulb;
      iv) a second flow line extending from said bulb air inlet;
      v) said second flow line having a test valve, said test valve having a valving member that is movable between open flow and closed flow positions;
      vi) wherein in the closed flow position, air is unable to flow into or out of the test valve into the testing manifold;
      vii) wherein said bulb is movable between relaxed and compressed positions, wherein the compressed position enables formation of a vacuum in said testing manifold when the test valve is in the closed flow position; and
      viii) wherein when said bulb is moved from the relaxed to the compressed position and said test valve is in the closed flow position, the one-way or non-return valve is functioning properly if the bulb does not lose the vacuum and return to the relaxed position;
   b) attaching the testing manifold of step "a" to the one-way or non-return valve to be tested by connecting the fitting to the one-way or non-return valve;
   c) closing the test valve;
   d) compressing the bulb to move the bulb from the relaxed to the compressed position; and
   e) wherein the bulb remaining in the compressed position of step "d" indicates that there is a vacuum in the testing manifold and the one-way or non-return valve to be tested is operating properly.

15. The method of claim 14 further comprising monitoring the test valve in the testing manifold.

16. The method of claim 14 wherein in step "d" a user manually compresses the bulb in step "d".

17. The method of claim 14 wherein in step "d" air is pumped into the helmet via the one-way or non-return valve that is being tested.

18. The method of claim 14 wherein after step "e" a user can connect the dive helmet to a breathing supply for use in diving operations.

19. The method of claim 14, wherein the fitting is connectable to the one-way or non-return valve via a male oxygen fitting.

* * * * *